(12) United States Patent
Hert et al.

(10) Patent No.: US 11,021,235 B2
(45) Date of Patent: Jun. 1, 2021

(54) OIL TRANSFER FOR A CONTROL SYSTEM REGULATING THE PROPELLER PITCH OF A TURBINE ENGINE

(71) Applicant: SAFRAN TRANSMISSION SYSTEMS, Colombes (FR)

(72) Inventors: Xavier Paul Lucien Hert, Magnanville (FR); Aldric Renaud Gabriel Marie Moreau De Lizoreux, Colombes (FR); Boris Pierre Marcel Morelli, Paris (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 184 days.

(21) Appl. No.: 16/168,675

(22) Filed: Oct. 23, 2018

(65) Prior Publication Data
US 2019/0118934 A1    Apr. 25, 2019

(30) Foreign Application Priority Data
Oct. 24, 2017 (FR) ...................................... 1760020

(51) Int. Cl.
*F01D 17/26* (2006.01)
*B64C 11/38* (2006.01)
*F01D 25/18* (2006.01)
*F02C 7/06* (2006.01)
*F01D 25/16* (2006.01)

(52) U.S. Cl.
CPC .............. *B64C 11/38* (2013.01); *F01D 17/26* (2013.01); *F01D 25/183* (2013.01); *F01D 25/16* (2013.01);
(Continued)

(58) Field of Classification Search
CPC ....... B64C 11/38; F01D 17/26; F01D 25/183; F05D 2240/63; F05D 2260/406; F05D 2260/79; F05D 2270/64
See application file for complete search history.

(56) References Cited

U.S. PATENT DOCUMENTS

| | | | | |
|---|---|---|---|---|
| 4,893,989 A | * | 1/1990 | Carvalho | ............... B63H 3/082 |
| | | | | 416/157 R |
| 5,141,399 A | * | 8/1992 | Duchesneau | ........... B64C 11/38 |
| | | | | 416/157 R |

(Continued)

FOREIGN PATENT DOCUMENTS

| | | |
|---|---|---|
| FR | 1256667 | 3/1961 |
| FR | 3013325 | 5/2015 |

OTHER PUBLICATIONS

"French Preliminary Search Report," FR Application No. 1760020 (dated Jul. 12, 2018) (with English translation cover sheet).

*Primary Examiner* — Christopher Verdier
*Assistant Examiner* — Theodore C Ribadeneyra
(74) *Attorney, Agent, or Firm* — Womble Bond Dickinson (US) LLP

(57) ABSTRACT

Oil transfer tube for a system to control the regulation of a turbine engine propeller pitch, in particular of an aircraft, the tube being intended to be mounted coaxially inside a tubular shaft of the propeller, the tube having an elongated shape and including a first male longitudinal end part intended to be inserted in a female housing of a stator casing equipped with an oil supply circuit of the tube, and a second male longitudinal end part around which is intended to be mounted a hydrodynamic bearing to guide the tube in the shaft, wherein the first end part includes a free annular end with a convex rounded cross-section intended to bear axially against an annular bottom of said housing, and in that said second end part comprises an outer axial annular bearing surface of an inner ring of the bearing, the annular bearing surface presenting in cross-section a convex curved shape.

9 Claims, 2 Drawing Sheets

(52) U.S. Cl.
CPC ............ *F02C 7/06* (2013.01); *F05D 2240/63* (2013.01); *F05D 2260/406* (2013.01); *F05D 2260/79* (2013.01); *F05D 2270/64* (2013.01)

(56) References Cited

U.S. PATENT DOCUMENTS

| | | | | |
|---|---|---|---|---|
| 5,186,608 | A * | 2/1993 | Bagge | B64C 11/38 416/147 |
| 6,077,040 | A * | 6/2000 | Pruden | B24C 11/00 416/153 |
| 6,196,797 | B1 * | 3/2001 | Bogden | B63H 3/06 416/157 R |
| 7,172,391 | B2 * | 2/2007 | Carvalho | B64C 11/30 416/1 |
| 10,077,103 | B2 * | 9/2018 | Plickys | B64C 11/32 |
| 10,288,163 | B2 * | 5/2019 | Miller | F16H 57/046 |
| 10,393,137 | B2 * | 8/2019 | Niergarth | B64C 11/38 |
| 2007/0081897 | A1 * | 4/2007 | Raes | B64C 11/38 416/134 A |
| 2010/0008779 | A1 | 1/2010 | Carvalho et al. | |
| 2010/0014976 | A1 * | 1/2010 | Arel | B64C 11/40 416/117 |
| 2011/0002786 | A1 * | 1/2011 | Perkinson | B60V 1/14 416/154 |
| 2016/0195012 | A1 * | 7/2016 | Olivier | B64C 11/38 415/122.1 |
| 2017/0008612 | A1 * | 1/2017 | Yamarthi | B64C 11/38 |
| 2017/0066524 | A1 * | 3/2017 | Miskiewicz | B64D 27/10 |
| 2017/0175877 | A1 * | 6/2017 | Altamura | F16C 3/023 |

\* cited by examiner

OIL TRANSFER FOR A CONTROL SYSTEM REGULATING THE PROPELLER PITCH OF A TURBINE ENGINE

SUMMARY OF THE INVENTION

The present invention relates especially to an oil transfer tube for a control system regulating the propeller pitch of a turbine engine, in particular of an aircraft.

STATE OF THE ART

The state of the art comprises especially documents US-A1-2010/008779, FR-A1-3 013 325 and FR-A-1 256 667.

The present invention applies to the field of turbine engines of the turboprop type, i.e. turbine engines equipped with at least one pusher propeller, which does not have any fairing, as opposed to a fan propeller, which has fairing.

A turbine engine of the turboprop type comprises primarily a "gas generator" part and a "propulsion" part which comprises a propeller.

To allow the turbine engine to operate optimally according to the different encountered flight phases, the blades of the propeller can be oriented about their respective pivot axes. They are rotationally driven about these axes by a control system that can be used to change the blade angles during flight, i.e. the pitch of the propeller. For example, according to the system, the blades can rotate from +90° to −30° during flight phases, from +30° to −30° during ground and reverse phases, and have a quick return to +90°, in a feathered position, in case of a malfunction during flight (engine failure), for which case the blades are parallel to the direction of motion of the aircraft and generate a minimal amount of drag.

In terms of control systems, those described in French patent applications FR-A1-2 980 770, FR-A1-2 996 272 and FR-A1-3 013 325 filed by the applicant are known.

This control system for the regulation of the pitch of propeller blades can comprise:
 a fluid power control mechanism with a linear actuator centred on the longitudinal axis of the turbine engine and secured to a fixed casing supporting the propeller.
 a connection mechanism to transform the motion of the mobile part of the actuator into a rotating motion of the blades to change the pitch thereof, and comprising, for that purpose, a transfer bearing whose inner ring is secured to the mobile part of the actuator, and a transmission means having rods between the outer ring of the bearing and the blades, and
 oil supply means and means to control the actuator.

As the mobile part of the actuator moves, the inner ring of the transfer bearing, secured to the mobile part of the actuator, follows the motion and drives a rotating outer ring through contact with the bearing members, and pulls or pushes on the rods of the transmission means, thereby changing the angle of the blades that rotate in their housings.

The invention concerns more specifically the oil supply of such a control system. In one particular case, these oil supply means comprise an oil transfer tube that is intended to be mounted coaxially inside a tubular shaft of the propeller. The tube has an elongated shape and comprises a first male longitudinal end part intended to be inserted into a female housing of a stator casing which is equipped with an oil supply circuit of the tube, and a second male longitudinal end part centred and guided by a bearing supported inside the propeller shaft. The tube enables the transfer of oil from the supply circuit to the abovementioned linear actuator.

Oil is transferred at high pressure and dynamic sealing must be ensured inside the propeller shaft to maintain the pressure used to control the actuator. According to the current state of the art, a second end part of the tube is guided by a hydrodynamic bearing with a reduced radial clearance to minimise leakage.

The integration of a hydrodynamic bearing in the propeller shaft requires the misalignments between the fixed part of the supply circuit secured to the casing and the rotating part secured to the propeller shaft to be controlled. These misalignments are both static and dynamic. Static misalignments are due to bearing assembly clearances, and dynamic misalignments are due to deformations generated by the loads of the casing and the propeller shaft.

These misalignments are significant and can have a significant impact on leaks of the bearing, and therefore on the response time of the propeller pitch control.

According to the current state of the art, the misalignments are absorbed by the deformation of the transfer tube between the inlet of oil in the casing and the hydrodynamic bearing. The current assembly of the tube is hyperstatic.

The purpose of the present invention is to provide a simple and efficient solution to this problem.

PRESENTATION OF THE INVENTION

The invention proposes an oil transfer tube for a system to control the regulation of a turbine engine propeller pitch, in particular of an aircraft, the tube being intended to be mounted coaxially inside a tubular shaft of the propeller, the tube having an elongated shape and comprising a first male longitudinal end part intended to be inserted in a female housing of a stator casing equipped with an oil supply circuit of the tube, and a second male longitudinal end part around which a hydrodynamic bearing to guide the tube in the shaft is intended to be mounted, characterised in that said first end part comprises a free annular end with a convex rounded cross-section intended to bear axially against an annular bottom of said housing, and in that said second end part comprises an outer axial annular bearing surface of an inner ring of said bearing, the annular bearing surface presenting in cross-section a convex curved shape.

The invention thus proposes to confer several degrees of freedom to the ends of the tube so as to reduce, and even eliminate, misalignments at the level of the hydrodynamic bearing. The cooperation of the first end part of the tube with the housing of the casing confers at least two degrees of freedom to this end thanks to the pivotal connection between the free end of this first end part and the bottom of the housing. The cooperation of the second end part of the tube with the inner ring of the bearing provides at least two degrees of freedom to the ring and to the bearing thanks to the pivotal connection between the bearing surface of the tube and the ring. The second end part is furthermore able to move in translation in the bearing.

The assembly of the transfer tube between the propeller shaft and the casing thus becomes isostatic. No stresses due to the deformation of the structures are transmitted by the hydrodynamic bearing. The bearing sees no misalignment or eccentricity.

The tube according to the invention can comprise one or more of the following characteristics, taken individually from each other or in combination one with another:

the first end part comprises an outer annular groove housing an O-ring seal, this seal being intended to cooperate with a wall of said housing, the second end part comprises an outer annular groove housing an O-ring seal, this seal being intended to cooperate with said inner ring, said annular bearing surface is formed by an outer annular edge of the tube.

The present invention also concerns a control system for regulating the pitch of a turbine engine propeller, in particular of an aircraft, comprising a tube such as described above.

The present invention also concerns a turbine engine, in particular of an aircraft, comprising at least one pusher propeller rotationally driven by a tubular shaft and a control system to regulate the pitch of the propeller, said system comprising a tube such as described above which is mounted coaxially with respect to the inside of the shaft, the first end part of the tube being inserted in a female housing of a stator casing equipped with an oil supply circuit of the tube, and the second end part of the tube being inserted in a hydrodynamic bearing guiding the tube in the shaft.

The turbine engine according to the invention can comprise one or more of the following characteristics, taken individually from each other or in combination one with another:

said housing comprises a frustoconical annular bottom against which the free end of said first part comes to bear, said bearing comprises an inner ring mounted on said second part and comprising a free end comprising an annular surface with a concave curved cross-section against which said annular bearing surface comes to bear, said annular surface presents a cross-section with a radius of curvature that is greater than the radius of curvature of the cross-section of said annular bearing surface.

the bearing is a hydrodynamic bearing.

BRIEF DESCRIPTION OF THE DRAWINGS

The invention will be better understood, and other details, characteristics and advantages thereof will appear more clearly upon reading the following description, given by way of nonlimiting example and with reference to the appended drawings, wherein.

DETAILED DESCRIPTION

Figure 1:
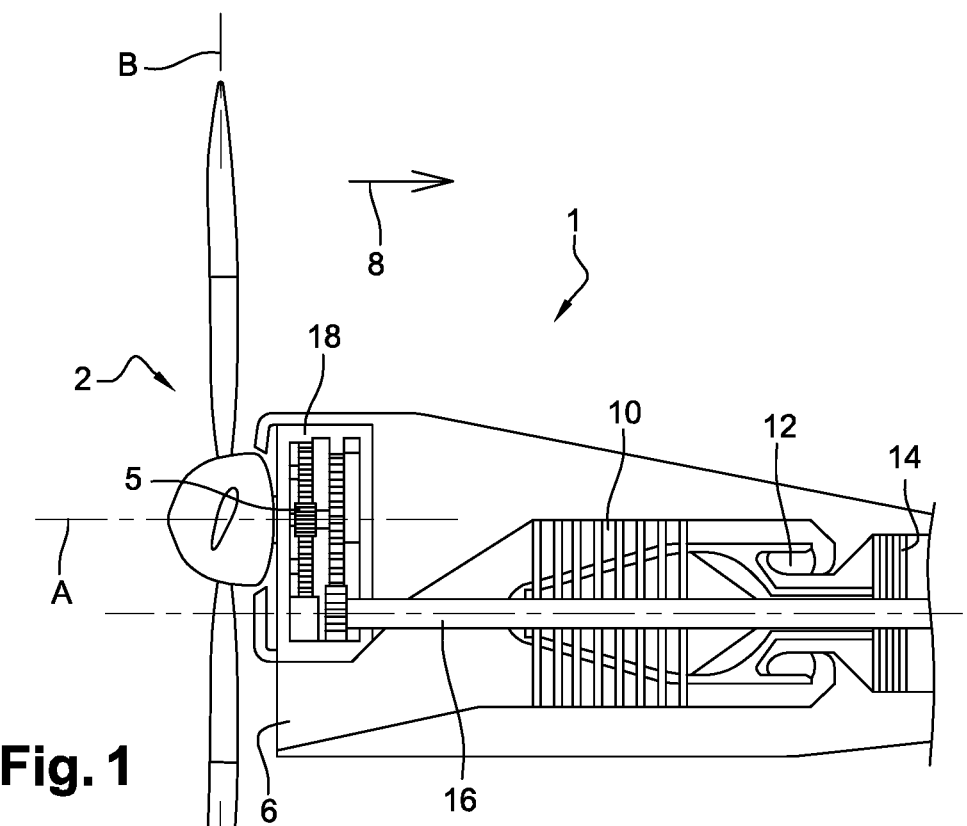
FIG. 1 is a partial schematic axial cross-section view of a turbine engine of the turboprop type.

FIG. 1 represents a turbine engine 1 of the turboprop type for an aircraft. The turbine engine conventionally comprises a propeller 2 rotationally mobile about a rotation axis A, on which is centred a propeller shaft 5. The speed of the propeller 2 is preferably of the order of 1000 to 1500 rpm, and its output torque is of approximately 30 kN·m.

Downstream from the propeller 2, the turboprop 1 comprises an air inlet 6 located for example vertically under the rotation axis A of the propeller. In this regard, it is noted that throughout the description, the terms "upstream" and "downstream" are used with reference to a primary direction of air flow through the propeller 2, this direction being parallel to the axis A and schematised by the arrow 8 in FIG. 1.

The air inlet 6 supplies air to a compressor or a group of compressors 10, downstream from which is located a combustion chamber 12. The combustion gases expand in a turbine or a group of turbines 14, which drives a motor shaft or a group of shafts 16. This shaft 16 is at a distance from and parallel to the propeller shaft 5. It drives a speed reducer 18, which in turn drives the propeller shaft 5. The motor shaft 16, the group of compressors 10, the combustion chamber 12 and the group of turbines 14 are centred on an axis parallel to the rotation axis A of the propeller 2, the air inlet 6 being located vertically under this axis A.

The speed reducer 18, also called gearbox, corresponds to a casing containing gears comprising in particular an epicyclic gearing.

The blades of the propeller 2 are of the variable-pitch type, i.e. they can be oriented about their radial pivot axes B by a control system regulating the pitch of the blades, so that they take an optimal angular desired position depending on the operating conditions of the turbine engine and according to the flight phases (rotation of the blades in both directions with increasing and decreasing propeller angles, and return of the blades to a feathered position in case of a malfunction). In the present description, only the orientation system 19 of the blades associated with the propeller 2 will be described. Conventionally, as described in the abovementioned documents of the prior art, the control system 19 comprises at least one linear displacement actuator, such as an actuator centred on the axis A, a motion transfer bearing, a transmission means and oil supply means of the actuator.

Figure 2:
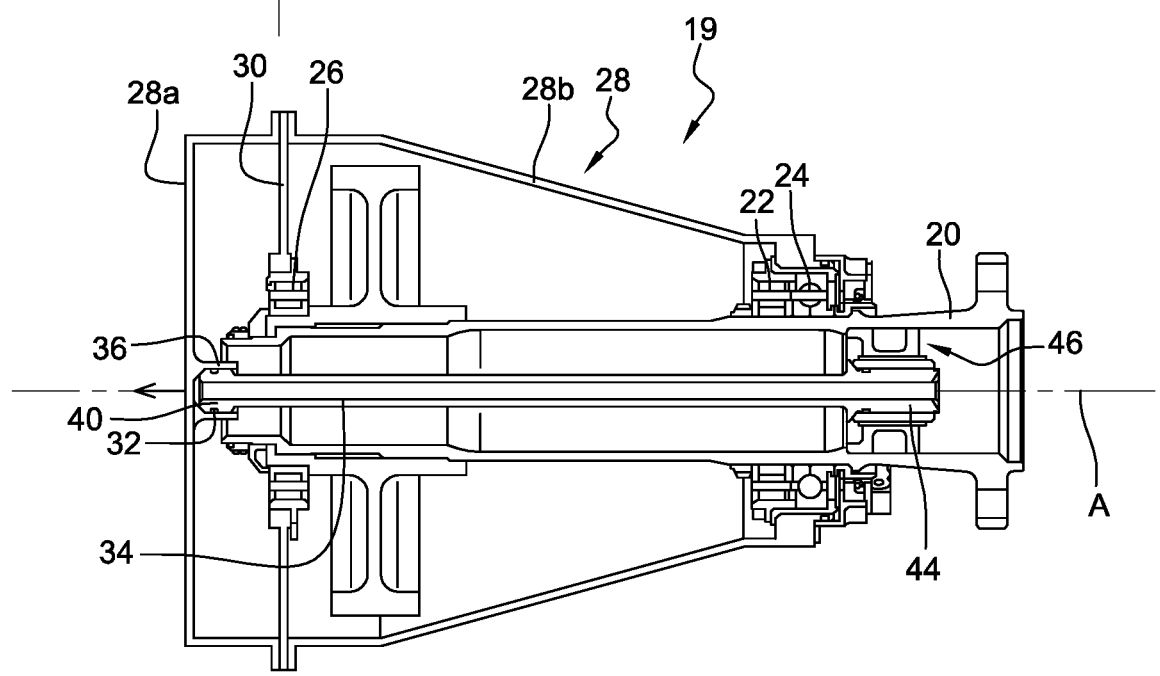
FIG. 2 is a schematic axial cross-section view of a control system to regulate the pitch of a turbine engine propeller according to the invention.
Figure 3:
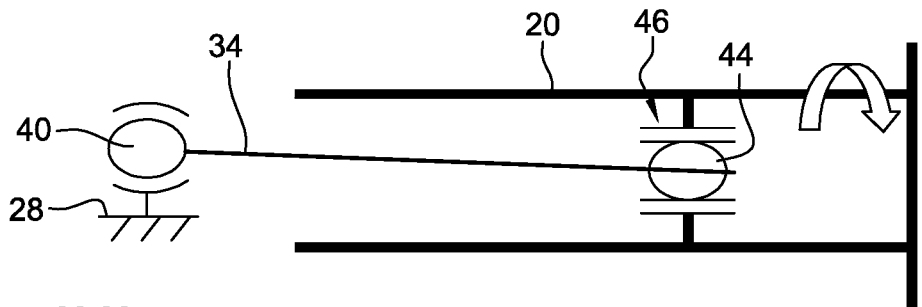
FIG. 3 is a very schematic axial cross-section view of the system of FIG. 2.
Figure 4:
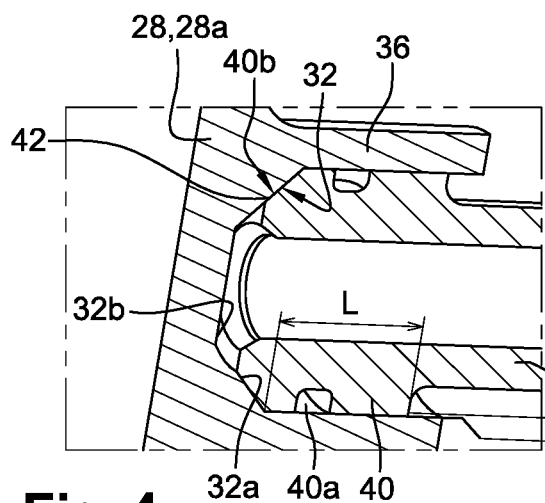
FIG. 4 is a schematic axial cross-section view of an upstream end of the system of FIG. 2.
Figure 5:
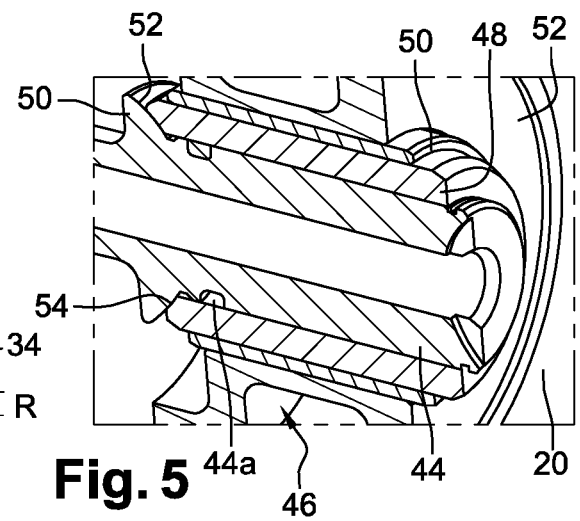
FIG. 5 is a schematic axial cross-section view of a downstream end of the system of FIG. 2.
Figure 6:
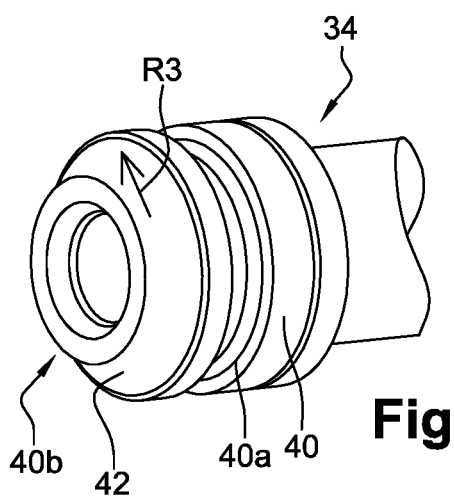
FIG. 6 is a schematic perspective view of a first end part of a transfer tube according to the invention.
Figure 7:
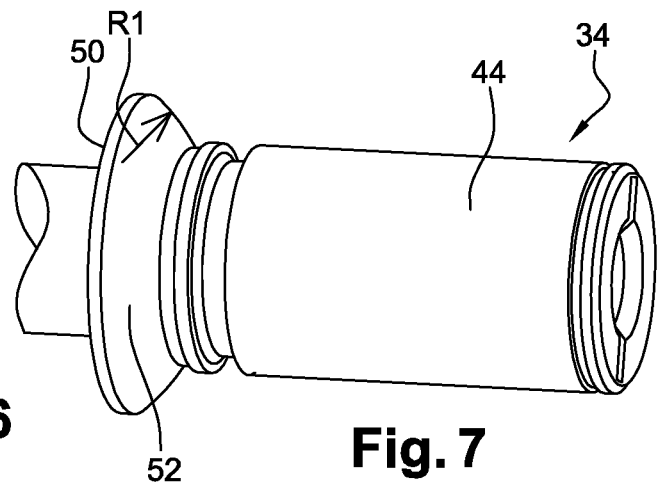
FIG. 7 is a schematic perspective view of a second end part of a transfer tube according to the invention.

FIG. 2 shows more precisely the environment of a control system 19 according to the invention. Reference 20 designates the propeller shaft, which is tubular and centred on the axis A.

The shaft 20 is centred and guided by the bearings 22, 24 and 26 in a stator casing 28 of the turbine engine. In the example represented, the shaft 20 is guided in the vicinity of one of its longitudinal ends, here the downstream end, by two bearings, respectively a roller bearing 22 and a ball bearing 24, and in the vicinity of its opposite, upstream, longitudinal end, by another roller bearing 26.

The casing 28 comprises especially a disked-shaped upstream annular part 28a, whose outer periphery is connected to the upstream end of the greatest diameter of a frustoconical upstream part 28b of the casing. This upstream end, of greater diameter, is also connected to an annular support 30 of the bearing 26 and the downstream end, of smaller diameter, of the part 28b forms an annular support of the bearings 22 and 24.

Figure 8:
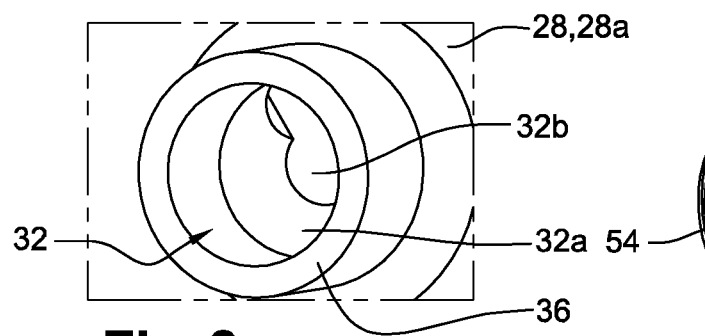
FIG. 8 is a schematic perspective view of a housing of a casing for the mounting of the first end part of the tube of FIG. 6.
Figure 9:
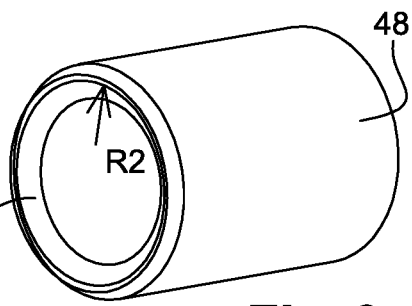
FIG. 9 is a schematic perspective view of an inner ring of a hydrodynamic bearing intended to be mounted on the second end part of the tube of FIG. 7.

The part 28a of the casing comprises in its centre, a cylindrical housing 32 oriented downstream and intended to receive the upstream end of a transfer tube 34. FIG. 8 allows to better visualise the housing 32, which is delimited by a cylindrical edge 36 centred on the axis A and protruding on the downstream radial side of the part 28a of the casing. The bottom of this housing 32 comprises, on the one hand, an outer peripheral annular surface 32a which has a conical cross-section, and on the other hand, a bottom surface 32b through which is pierced with an orifice 38 for the supply of pressurised oil from the tube 34.

The housing 32 thus serves to receive an upstream end of the tube 34 and to supply pressurised oil thanks to a supply circuit of which only the supply orifice 38 is visible in the drawings.

As seen in FIG. 2, the upstream end of the propeller shaft 20 partially surrounds the cylindrical edge 36.

The transfer tube 34 extends over a major part of the longitudinal dimension of the shaft 20, being housed coaxially within said shaft. The tube 34 has a generally elongated shape and comprises a first part of a longitudinal end 40 inserted axially from the downstream direction in the housing 32. The end part 40 has a generally cylindrical shape and is inserted by male-female press fitting in the housing 32.

The end part 40 comprises an outer annular groove 40a for housing an O-ring seal intended to cooperate, for sealing purposes, with the inner cylindrical surface of the edge 36. In addition, the free annular end 40b, thus upstream, of the end part 40 comprises an outer peripheral surface 42 having a curved cross-section intended to come to bear against the surface 32a to form a ball-joint connection between the part 40 and the casing 28. This ball-joint connection can be facilitated by the length L or the axial dimension of the part 40, which is inserted in the housing 32, and by the radial clearance R between the part 40 and the inner cylindrical surface of the edge 36. The length L is, for example, between 5 mm and 30 mm, and preferably between 10 mm and 20 mm. The radial clearance is, for example, less than 2 mm and preferably less than 1 mm. In the example represented, the part 40 comprises a radial excess thickness with respect to the middle member of the tube. The total length of the part 40, from its free end 40b to the end of the excess thickness, is less than the depth or the axial dimension of the housing 32.

The ball-joint connection allows to confer two degrees of freedom to the part 40 of the tube and in particular two degrees of freedom in pivoting with respect to a pivot centre defined by the convex curved surface of the surface 42. Rotation about the axis A is prevented by friction of the O-ring seal between the inner surface of the housing 36 and the surfaces of the groove of the seal 40a. The surface 42 has here a radius of curvature referenced R3.

The tube 34 comprises, in the downstream section, a second part of a longitudinal end 44 of a generally cylindrical shape, which is centred and guided in the shaft 20 by a hydrodynamic bearing 46. The second part 44 is inserted by male-female press-fitting in the bearing 46.

The end part 44 comprises an outer annular groove 44a for housing an O-ring seal intended to cooperate, for sealing purposes, with the inner cylindrical surface of an inner ring 48 of the bearing 46. This inner ring has its upstream end which bears axially against an outer peripheral surface 50 of the part 44.

The surface 50 is, in this case, formed by an outer annular edge of the tube and comprises an annular surface 52 having in cross-section a convex curved shape, which is oriented substantially downstream, and against which the upstream end of the ring 46 comes to bear. This upstream end comprises an annular surface 54 with a concave curved cross-section intended to cooperate with the surface 52 to form another ball-joint connection between the part 44 and the bearing 46.

This ball-joint connection allows to confer two degrees of freedom to the ring 48 of the bearing with respect to the part 44 of the tube and in particular the two degrees of pivoting freedom with respect to a pivot centre defined by the convex curved surface of the surface 52. Rotation about the axis A is prevented by the friction of the O-ring seal between the inner surface of the ring 48 and the surfaces of the groove of the seal 44a. The surface 52 here has a radius of curvature referenced R1 and the surface 54 has a radius of curvature R2. R2 is preferably greater than R1. The end part 44 of the tube is also able to move in translation along the axis A and rotate about this same axis inside the hydrodynamic bearing.

The ring 48 is surrounded by a sleeve 50, itself being surrounded by an outer ring 52 of the hydrodynamic bearing. The outer ring 52 is secured to the propeller shaft and fixed inside the latter.

During operation, pressurised oil is located downstream from the bearing, and supplied to the bearing for its hydrodynamic functioning. A film of oil forms between the ring 48 that does not turn and the sleeve 50 which is rotationally driven by the propeller shaft 20. The speed difference between these elements generates a hydrodynamic lift effect.

The end parts 40, 44 of the tube, and in particular their surfaces 42, 52 shaped as spherical portions, can be achieved by a simple turning process. The surfaces 42, 52 can be locally treated in order to reinforce their hardness and to limit their friction-induced wear.

As can be seen in the drawings, for each of the two end parts 40, 44 of the tube 34, the O-ring seal is located as close as possible to the ball-joint connection to limit the impact of misalignments on radial clearances.

In a particular embodiment of the invention, a 10' angular misalignment is possible on the side of the casing 28 without a loss of sealing at the level of the O-ring seal.

In the embodiment represented, the outer diameters of the end parts 40, 44 of the tube are different, the end part 40 having a smaller diameter than the end part 44. This can be advantageous for reasons of space used inside the propeller shaft 20.

In operation, oil which flows from the supply circuit can be at a very high pressure, of the order of 30 to 50 bars. This pressure exerts stresses by piston effect on the tube 34 which is applied in the upstream direction. To take up the stresses at the upstream of the tube, it is possible to insert a ball-joint ring made of a suitable material, such as bronze or steel, between the part 40 of the casing 28, for example inside the housing 32.

The direct benefits provided by the invention can be:
  increasing the reliability of the dynamic sealing which no longer transmits stresses between the transfer tube and the support of the bearing in the shaft. It is therefore less subject to wear; and
  improving the dynamic sealing of the hydrodynamic bearing by limiting misalignments and eccentricities generated in the case of a hyperstatic assembly.

The indirect benefits are:
  reducing the response time of the propeller pitch control; and
  increasing the efficiency of the control system.

The invention claimed is:
1. An oil transfer tube for a system to control regulation of a turbine engine propeller pitch of an aircraft, said turbine engine propeller having a rotational axis A, the tube being intended to be mounted coaxially inside a tubular shaft of the turbine engine propeller, the tube having an elongated shape and comprising a first male longitudinal end part intended to be inserted in a female housing of a stator casing equipped with an oil supply circuit of the tube, and a second male longitudinal end part around which is intended to be mounted a hydrodynamic bearing to guide the tube in the shaft, wherein said first male longitudinal part comprises a free annular end comprising an outer peripheral surface shaped as a spherical portion and having a convex rounded cross-section in a plane passing through said rotational axis A, said free annular end being intended to bear axially against an annular bottom of said housing to form a ball-joint connection between the first male longitudinal part and the casing, and in that said second male longitudinal end part comprises an outer axial annular bearing surface of an inner ring of said bearing shaped as a spherical portion, and comprising an annular surface having a cross-section with a convex curved shape in a plane passing through said rotational axis A and intended to bear against an annular surface of an upstream end of aa-said inner ring of the bearing to form another ball-joint connection between said second male longitudinal end part and the bearing.

2. The oil transfer tube according to claim 1, wherein the first male longitudinal end part comprises an outer annular groove housing an O-ring seal, this seal being intended to cooperate with a wall of said housing.

3. The oil transfer tube according to claim 1, wherein the second male longitudinal end part comprises an outer annular groove housing an O-ring seal, this seal being intended to cooperate with said inner ring of said bearing.

4. The oil transfer tube according to claim 1, wherein said annular bearing surface is formed by an outer annular edge of the tube.

5. A control system for regulating the pitch of a turbine engine propeller of an aircraft, comprising the oil transfer tube according to claim 1.

6. A turbine engine of an aircraft, comprising the turbine engine propeller rotationally driven by the tubular shaft and the control system to regulate the pitch of said turbine engine, said system comprising the oil transfer tube according to claim 1, which is mounted coaxially with respect to the inside of the shaft, a first end part of the oil transfer tube being inserted in the female housing of the stator casing equipped with the oil supply circuit of the oil transfer tube, and a second end part of the oil transfer tube being inserted in the hydrodynamic bearing guiding the oil transfer tube in the shaft.

7. The turbine engine according to claim 6, wherein said housing comprises a frustoconical annular bottom bearing the free end of said first part.

8. The turbine engine according to claim 6, wherein said bearing comprises an inner ring mounted on said second part and comprising a free end comprising an annular surface with a concave curved cross-section against which said annular bearing surface comes to bear.

9. The turbine engine according to claim 8, wherein said annular surface presents a cross-section with a radius of curvature (R2) that is greater than the radius of curvature (R1) of the cross-section of said annular bearing surface.

\* \* \* \* \*